(12) United States Patent
Da Silva et al.

(10) Patent No.: US 11,025,332 B2
(45) Date of Patent: Jun. 1, 2021

(54) MANAGEMENT OF BEAM LEVEL MEASUREMENT FILTERING

(71) Applicant: Telefonaktiebolaget LM Ericsson (publ), Stockholm (SE)

(72) Inventors: Icaro L. J. Da Silva, Solna (SE); Muhammad Kazmi, Sundbyberg (SE); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/500,469

(22) PCT Filed: Apr. 3, 2018

(86) PCT No.: PCT/IB2018/052294
§ 371 (c)(1),
(2) Date: Oct. 3, 2019

(87) PCT Pub. No.: WO2018/185657
PCT Pub. Date: Oct. 11, 2018

(65) Prior Publication Data
US 2020/0195326 A1    Jun. 18, 2020

Related U.S. Application Data

(60) Provisional application No. 62/480,914, filed on Apr. 3, 2017.

(51) Int. Cl.
*H04B 7/08*    (2006.01)
*H04B 1/38*    (2015.01)
*H04B 7/06*    (2006.01)

(52) U.S. Cl.
CPC ............... *H04B 7/088* (2013.01); *H04B 1/38* (2013.01); *H04B 7/0617* (2013.01); *H04B 7/0619* (2013.01)

(58) Field of Classification Search
CPC .................... H04B 7/0617–0663; H04B 7/088
See application file for complete search history.

(56) References Cited

U.S. PATENT DOCUMENTS

| | | | |
|---|---|---|---|
| 2013/0040640 A1* | 2/2013 | Chen ..................... | H04W 36/30 455/434 |
| 2014/0086173 A1* | 3/2014 | Sadeghi .................. | H04L 5/003 370/329 |

(Continued)

OTHER PUBLICATIONS

PCT International Search Report for International application No. PCT/IB2018/052294—dated Jun. 20, 2018.

(Continued)

*Primary Examiner* — Gennadiy Tsvey
(74) *Attorney, Agent, or Firm* — Baker Botts, LLP

(57) ABSTRACT

A method for use in a wireless device comprises detecting a first set of beamformed signals from one or more cells. The method further comprises allocating beam-level filters of the wireless device to a subset of beamformed signals of the first set of beamformed signals based on the detected beamformed signals. The method further comprises monitoring the subset of the first set of beamformed signals using the allocated beam-level filters. A wireless device comprises one or more interfaces, memory, and processing circuitry. The processing circuitry is configured to execute instructions stored in the memory, whereby the wireless device is configured to perform the method above.

22 Claims, 9 Drawing Sheets

(56) References Cited

U.S. PATENT DOCUMENTS

| | | | | |
|---|---|---|---|---|
| 2015/0365865 | A1* | 12/2015 | Belschner | H04W 36/08 |
| | | | | 455/436 |
| 2016/0150435 | A1* | 5/2016 | Baek | H04W 16/28 |
| | | | | 370/252 |
| 2016/0337916 | A1* | 11/2016 | Deenoo | H04W 36/0088 |
| 2017/0034730 | A1* | 2/2017 | Zhang | H04W 36/30 |
| 2017/0208494 | A1* | 7/2017 | Moon | H04L 5/0048 |
| 2017/0324459 | A1* | 11/2017 | Koskela | H04B 7/0617 |
| 2018/0199328 | A1* | 7/2018 | Sang | H04B 7/022 |
| 2018/0270717 | A1* | 9/2018 | Kakishima | H04B 7/0619 |
| 2019/0045377 | A1* | 2/2019 | Kakishima | H04W 72/02 |

OTHER PUBLICATIONS

3GPP TSG-RAN WG2 Meeting #96; Reno, Nevada, USA; Source: Ericsson; Title: Filtering of connected mode RSs (R2-168729)—Nov. 14-18, 2016.

3GPP TSG RAN WG2 Meeting #97bis; Spokane, USA; Source: Intel Corporation; Title: Filter, serving cell quality and remaining issues in RRM (R2-1703417)—Apr. 3-7, 2017.

3GPP TSG-RAN WG2 #97bis; Spokane, USA; Source: Ericsson; Title: Determination of serving cell quality in NR (Tdoc R2-1702797)—Apr. 3-7, 2017.

* cited by examiner

MANAGEMENT OF BEAM LEVEL MEASUREMENT FILTERING

PRIORITY

This nonprovisional application is a U.S. National Stage Filing under 35 U.S.C. § 371 of International Patent Application Serial No. PCT/IB2018/052294 filed Apr. 3, 2018 and entitled "MANAGEMENT OF BEAM LEVEL MEASUREMENT FILTERING" which claims priority to U.S. Provisional Patent Application No. 62/480,914 filed Apr. 3, 2017 both of which are hereby incorporated by reference in their entirety.

TECHNICAL FIELD

The present disclosure relates, in general, to wireless communications and, more particularly, to managing beam level measurement filtering.

BACKGROUND

Measurement Model in LTE

In Long-Term Evolution (LTE), handover decisions at a serving network node (such as an evolved NodeB (eNB)) are taken based on events configured at a served wireless device (such as a user equipment (UE)) based on the radio quality of different cells. These measurements are performed based on cell-specific reference signals so that a cell quality is derived.

In LTE, the UE uses cell-specific reference signals (CRS) and synchronization signals (PSS/SSS) to identify a cell and perform radio resource management (RRM) measurements to derive a cell quality. It is crucial that the measurements are performed within a limited time, therefore for both intra- and inter-frequency measurements the wireless device, e.g., the UE, is expected to fulfill certain RRM requirements depending on channel conditions and noise levels. To do that the UE typically collects periodic snapshots (e.g. at every 40 ms) of CRS (after cell detection) and perform coherent and non-coherent averages per sample in a limited bandwidth. The UE performs filtering at the physical layer before reporting the measurement results to higher layers. Every time the higher layers receive a measurement result from the physical layer the UE can perform L3 filtering. In LTE, the standardized L3 filtering provides some level of harmonization among UEs. However, the parameters of the L1 filtering are not standardized and vary based on UE implementation.

The LTE filtering model, as captured in TS 36.300, is reproduced in FIG. 1. Point A may indicate a point in which measurements are taken (e.g., samples taken at the wireless device) that are internal to the physical layer. The wireless device may include Layer 1 (L1) filtering. Internal L1 filters may filter the inputs measured at point A. The exact L1 filtering applied is implementation dependent. Accordingly, how measurements are actually executed in the physical layer by an implementation (via inputs A and L1 filtering) are not constrained by the current standards.

At point B, measurements filtered by L1 filtering are reported to layer 3 (L3). L3 filtering is performed on the measurements provided at point B. Behavior of the L3 filters may be standardized and the configuration of the layer 3 filters may be provided by RRC signaling. L3 filtering may occur within the wireless device or may occur outside the wireless device, such as at another network node. A filtering reporting period at point C after L3 filtering may equal a single measurement period at point B.

At point C, measurements are provided after processing in the L3 filter(s). The reporting rate at point C may be identical to the reporting rate at point B. The measurements provided at point C may be used as input for one or more evaluation of reporting criteria.

The filtering model may also include an evaluation of reporting criteria. This evaluation may check whether actual measurement reporting is necessary at point D. The evaluation can be based on more than one flow of measurements at reference point C, e.g., to compare between different measurements. For example, there can be two measurements illustrated by input C and C'. The UE can evaluate the reporting criteria at least every time a new measurement result is reported at point C, C'. The reporting criteria may be standardized and the configuration may be provided by RRC signaling (e.g., UE measurements). After evaluation, if reporting is necessary or otherwise authorized, a message including measurement report information may be sent on the radio interface.

L1 filtering may introduce a certain level of measurement averaging. How and when the UE exactly performs the required measurements may be implementation specific to the point that the output at B fulfils the corresponding requirements specified, e.g., in 3GPP TS 36.133. L3 filtering and the parameters used are specified by RAN2 in TS 36.331 and do not introduce any delay in the sample availability between B and C. Measurements at point C, C' may be the input used in the event evaluation.

Also, at every sample (e.g., of 40 ms) the higher layers at the UE will have available one or multiple cell-specific reference signal received power (RSRP) (and/or reference signal received quality (RSRQ)) that can be used to trigger measurement reports (in the case the UE is in RRC_CONNECTED).

NR Cell and Beamforming

The so-called 5G system, from a radio perspective started to be standardized in 3GPP and the so-called New Radio (NR) refers to the radio interface. One of the characteristics of 5G and/or NR is the frequency range going to higher frequencies than LTE where more challenging propagation conditions exist, such as a higher penetration loss. To mitigate some of these effects, multi-antenna technologies such as beamforming are likely to be implemented widely.

Hence, while in LTE a UE discovers a cell and perform RRM measurements based on signals transmitted in an omnidirectional or cell-wide (a.k.a. sectored) manner (i.e. PSS/SSS/CRS), in NR, the UE should be able to perform cell discovery and RRM measurements on signals that can be beamformed.

The current agreements in RAN1 show that to cope with beamforming, NR will define a signal structure to carry synchronization signals for cell discovery and RRM measurements for RRC_IDLE and RRC_CONNECTED UEs. In RRC_CONNECTED, additional reference signals (such as CSI-RS) can also be used. That signal structure is called Synchronization Signals (SS) Block Set.

Herein we describe a non-limiting example of SS block and SS burst configuration which may be assumed in other embodiments. FIG. 2 illustrates an example configuration of SS blocks, SS bursts, and SS burst sets/series.

SS Block:

New Radio Primary Synchronization Signal (NR-PSS), New Radio Secondary Synchronization Signal (NR-SSS) and/or New Radio Physical Broadcast Channel (NR-PBCH) can be transmitted within an SS block. For a given frequency band, an SS block corresponds to N Orthogonal Frequency Division Multiplexing (OFDM) symbols based on the default subcarrier spacing, and N is a constant. UE shall be able to identify at least OFDM symbol index, slot index in a radio frame and radio frame number from an SS block. A single set of possible SS block time locations (e.g., with respect to radio frame or with respect to SS burst set) is specified per frequency band. At least for multi-beams case, at least the time index of SS-block is indicated to the UE. The position(s) of actual transmitted SS-blocks can be informed for helping CONNECTED/IDLE mode measurement, for helping CONNECTED mode UE to receive DL data/control in unused SS-blocks and potentially for helping IDLE mode UE to receive DL data/control in unused SS-blocks.

SS Burst: One or multiple SS block(s) compose an SS burst. The maximum number of SS-blocks, L, within SS burst set may be carrier frequency dependent, e.g.:

For frequency range category #A (e.g., 0~6 GHz), the number (L) is TBD within L≤[16]

For frequency range category #B (e.g., 6~60 GHz), the number is TBD within L≤[128]

SS Burst Set:

One or multiple SS burst(s) further compose an SS burst set (or series) where the number of SS bursts within a SS burst set is finite. From physical layer specification perspective, at least one periodicity of SS burst set is supported. From UE perspective, SS burst set transmission is periodic. At least for initial cell selection, UE may assume a default periodicity of SS burst set transmission for a given carrier frequency (e.g., one of 5 ms, 10 ms, 20 ms, 40 ms, 80 ms, or 160 ms). UE may assume that a given SS block is repeated with a SS burst set periodicity. By default, the UE may neither assume the gNB transmits the same number of physical beam(s), nor the same physical beam(s) across different SS-blocks within an SS burst set. For each carrier, the SS blocks may be time-aligned or overlap fully or at least in part, or the beginning of the SS blocks may be time-aligned (e.g., when the actual number of transmitted SS blocks is different in different cells).

Differently from LTE, the physical signals (e.g., reference signals and synchronizations signals) used for cell discovery and RRM measurements in NR should be beamformed. In LTE the UE keeps track of the quality of cells (serving and neighbors) for different purposes, e.g.:

Radio Link Monitoring: UE tracks the quality of its serving cell, so it can detect out-of-sync events and in-sync events that may later trigger radio link failure procedures; Mobility: UE tracks the quality of neighbor cells to identify a handover candidate in a timely manner, e.g., before losing the network connection;

CA configuration: UE tracks the quality of intra-frequency and inter-frequency neighbor cells in order to be get in a timely manner a suitable CA configuration (e.g., a set of serving carriers and serving cells such as PSCC and PSCell, SCCs and SCells);

Power control: UE performs serving cells measurements to be able to perform power control;

Link adaptation: UE performs serving cells measurements to be able to adapt to the link quality.

Cell level quality measurements will also be needed in NR at least for similar purposes. However, in addition to that, current discussions point to the direction where beam level quality measurements per cell can also be needed. These beam-level quality measurements per cell can be useful at least in the following cases:

Enhance Measurement Reports in RRC_CON-NNECTED:

by reporting beam-level RSRP and/or RSRQ measurements the network can know the best beams in neighbor cells which are potential target candidates. By knowing that, the serving network nodes, e.g., Next Generation NodeBs (gNBs), can improve handover algorithms and prioritize cells with a higher number of beams (higher likelihood that handover will succeed) and target can allocate dedicated random access channel (RACH) resources only associated to a limited number of beams.

Beam Selection/Tracking of Neighbor Cells to Speed Up Random Access in RRC_CONNECTED During Handover Execution:

Here the UE can track the best beam(s) of a set of neighbor cells so that when the handover command is received the UE already knows the best beam(s) to initiate random access with the target instead of waiting for further occurrences of the signals to then perform synchronization and beam selection.

Beam Selection/Tracking of Serving Cell(s) to Speed Up Random Access in RRC_CONNECTED During Beam Recovery:

If the UE detects a failure in its beam-link pair/serving beam(s) of its serving cell(s) the UE should select a DL timing reference, which could be a new SS Block of its serving cell. Hence, if that is done beforehand, the UE can quicker trigger the recovery, which is done by sending an UL signal (e.g. a PRACH preamble or Scheduling Request over PUCCH).

Beam Selection/Tracking of a Cell the UE is Camping in RRC_INACTIVE/RRC_IDLE:

An idle/inactive UE should perform DL beam selection of the cell it is camping before accessing. To do that selection, the UE should perform measurement on a beam-level.

Many of the above-described beam-level quality measurements can be defined based on SS Block Set signals or beamformed CSI-RS.

Agreements in the RAN groups in 3GPP also point in that direction. For example, in RAN2#96 the following agreements have been made concerning measurement reports in NR for RRC_CONNECTED UEs:

2 Measurement report will contain cell measurements
FFS whether the measurement report contains beams measurements In RAN2#97 NR meeting in Athens, the following agreement was made:

Agreement:
1 Support reporting of individual beam measurement i.e. that network can configure the UE to report the N best beams. Actual beam result may be reported (as in LTE) FFS whether it will be possible to report 'beam' based on idle RS (RAN1 issue)

In RAN1 NR AdHoc, the following has also been agreed:
RSRP(s) can be measured from the IDLE mode RS.
  One RSRP value is measured from the IDLE mode RS per SS block.
FFS: UE measures one RSRP value from multiple SS blocks in an SS burst set
  The measured values are referred to "SS-block-RSRP"
It is RAN1's understanding that "SS-block-RSRP" may correspond to the "beam quality" in RAN2 agreements in multi-beam case, at least in IDLE mode.
RSRP(s) can be measured from the additional RS for CONNECTED mobility if such additional RS are defined (note that this is not yet agreed in RAN1)

FFS: How to derive RSRP value(s) utilizing the antenna ports and resource(s) of the RS FFS: Association of the measured qualities in CONNECTED mode to the "beam quality" in RAN2 agreement in CONNECTED mode Note: It is up to RAN2 how to derive cell-level quality from the measured value(s) for L3 mobility

SUMMARY

In a first set of embodiments, a method in a wireless device comprises detecting a first set of beamformed signals from one or more cells. The method further comprises allocating beam-level filters of the wireless device to a subset of beamformed signals of the first set of beamformed signals based on the detected beamformed signals. The method further comprises monitoring the subset of the first set of beamformed signals using the allocated beam-level filters.

In a second set of embodiments, a wireless device comprises one or more interfaces, memory, and processing circuitry. The processing circuitry is configured to execute instructions stored in the memory. The wireless device is configured to detect a first set of beamformed signals from one or more cells. The wireless device is further configured to allocate beam-level filters of the wireless device to a subset of beamformed signals of the first set of beamformed signals based on the detected beamformed signals. The wireless device is further configured to monitor the subset of the first set of beamformed signals using the allocated beam-level filters.

In a third set of embodiments, a computer program product comprises a non-transitory computer readable storage medium storing computer readable program code. The computer readable program comprises program code for detecting a first set of beamformed signals from one or more cells. The computer readable program further comprises program code for allocating beam-level filters of the wireless device to a subset of beamformed signals of the first set of beamformed signals based on the detected beamformed signals. The computer readable program further comprises program code for monitoring the subset of the first set of beamformed signals using the allocated beam-level filters.

In certain embodiments, allocating the beam-level filters is based on rules received from a network to which the wireless device is connected.

In certain embodiments, allocating the beam-level filters is based on one or more rules determined by the wireless device.

In certain embodiments, allocation of a respective one of the beam-level filters is further based on a characteristic of the respective beam-level filter.

In certain embodiments, the method/wireless device/computer program product further comprise associating one of the beam-level filters with one of the beamformed signals in the first set of beamformed signals for a predetermined time period.

In certain embodiments, the beam-level filters are L1 filters or L3 filters.

In certain embodiments, there is a maximum number (N) of beam-level filters available to be allocated to monitor beamformed signals.

In certain embodiments, allocating the beam-level filters comprises determining a partitioning of the beam-level filters into one or more partitions ($N_i$). In some embodiments, each of the one or more partitions is associated with a cell, carrier, reference signal, or carrier type. In some embodiments, the one or more partitions Ni comprise a first partition associated with a serving or camping cell of the one or more cells and a second partition associated with one or more neighbor cells of the one or more cells. In some embodiments, the one or more partitions Ni comprise a first partition associated with a serving or camping cell of the one or more cells and a plurality of partitions, each associated with a respective neighbor cell of the one or more cells. In some embodiments, the one or more partitions Ni are defined per carrier and the number of allocated beam-level filters is zero for a non-serving carrier and non-zero for a serving carrier or carrier component. In some embodiments, the one or more partitions Ni are determined based on available processing or memory resources in the wireless device.

In certain embodiments, there is a maximum number (N) of beam-level filters available to be allocated to monitor beamformed signals. Allocating the beam-level filters comprises determining a partitioning of the beam-level filters into one or more partitions ($N_i$). The sum of a number of beam-level filters partitioned into each respective partition (Ni) equals N.

In certain embodiments, the method/wireless device/computer program product further comprises reallocating the beam-level filters. In some embodiments, the method/wireless device/computer program product further comprises detecting a second set of beamformed signals, wherein the second set of beamformed signals is not the same as the first set of beamformed signals. Reallocation of the beam-level filters is based on the differences between the first set of beamformed signals and the second set of beamformed signals.

In certain embodiments, the method/wireless device/computer program product further comprises removing one or more beamformed signals from the subset of beamformed signals to which the beam-level filters have been allocated.

In certain embodiments, the method/wireless device/computer program product further comprises determining one or more measurements of the first set of beamformed signals.

In certain embodiments, the method/wireless device/computer program product further comprises delaying measurement of the first set of beamformed signals if the number of beam-level filters required to monitor the determined subset of the first set of beamformed signals is greater than the number of beam-level filters allocated to the subset of the first set of beamformed signals.

In certain embodiments, the method/wireless device/computer program product further comprises determining a maximum number of beam-level filters to allocate to the subset of beamformed signals of the first set based on a maximum number of beam level filters to be allocated to each of one or more serving or camping cells and a maximum number of beam-level filters to be allocated to each of one or more neighbor cells. In some embodiments, the maximum number of beam-level filters for the one or more serving cells or one or more neighbor cells is defined per carrier on the network. In some embodiments, at least one of the maximum number of beam level filters to be allocated to each of one or more serving cells is based on whether the respective serving cell is activated on the corresponding carrier. In some embodiments, if the wireless device is idle, the maximum number of beam-level filters to be allocated to each of the one or more neighbor cells is zero.

In certain embodiments, allocating the beam-level filters comprises partitioning the number of beam-level filters amongst the one or more cells based on a predetermined number of beams required to compute a cell quality value for each of the one or more cells.

In certain embodiments, the number of beam-level filters allocated to the subset of beamformed signals of the first set of beamformed signals is less than a number of beam-level filters available at the wireless device.

In certain embodiments, the method/wireless device/computer program product further comprises adding one or more beamformed signals of the one or more cells to the subset of the first set of beamformed signals.

In certain embodiments, the method/wireless device/computer program product further comprises allocating a beam-level filter to a detected signal of the first set of beamformed signals when the detected signal has a signal level above a predetermined signal level threshold over a predetermined period of time.

In certain embodiments, a number of detected beamformed signals exceeds a number of filters available to be allocated for beam-level filtering. The method/wireless device/computer program product further comprises prioritizing the detected beamform signals.

In certain embodiments, the method/wireless device/computer program product further comprises removing a beamformed signal from the first subset if the beamformed signal has a signal level below a predetermined signal level threshold over a predetermined period of time.

In certain embodiments, the method/wireless device/computer program product further comprises removing a beamformed signal from the first subset if the beamformed signal has a signal level below a predetermined signal level threshold for a predetermined number of occasions of measurement.

In certain embodiments, the method/wireless device/computer program product further comprises computing a cell quality based on the monitored beamformed signal(s) for each cell that is detected.

In certain embodiments, the method/wireless device/computer program product further comprises reporting beam-filtered measurements based on the monitored beamformed signals. In some embodiments, the method/wireless device/computer program product further comprises reporting, to a network node, the computed cell quality based on the monitored beamformed signals for each cell that is detected.

In certain embodiments, allocating the beam-level filters is further based on the cell quality of each of the one or more cells. In some embodiments, allocating the beam-level filters is further based on the relative signal strength of detected beamformed signals of the first set of beamformed signals for each cell of the one or more cells. In some embodiments, allocating the beam-level filters comprises allocating the beam-level filters to a first cell having a best cell quality of the one or more cells before allocating to any other cell of the one or more cells.

In certain embodiments, beam-level filters are allocated to the first cell until a predetermined number of beam-level filters are allocated to the first cell. Allocating the beam-level filters further comprises allocating the beam-level filters to a second cell having a second-best cell quality of the one or more cells before allocating to any other cell of the one or more cells other than the first cell.

In certain embodiments, the method/wireless device/computer program product further comprises reallocating one or more beam-level filters assigned to beamformed signals from a first cell of the one or more cells based on a signal strength of the first cell exceeding a predetermined threshold.

In certain embodiments, the method/wireless device/computer program product further comprises communicating a beam measurement capability of the wireless device to a network node. In some embodiments, communicating the beam measurement capability comprises communicating a beam filtering capability of the wireless device.

In a fourth set of embodiments, a method in a network node comprises signaling one or more rules to the wireless device. The one or more rules indicate how to allocate one or more beam-level filters of the wireless device to beamformed signals detected by the wireless device. The method further comprises receiving a measurement that the wireless device performs based on monitoring the beamformed signals according to the allocation of the one or more beam-level filters. The method further comprises performing an operation based on the received measurement.

In a fifth set of embodiments, a network node comprises one or more interfaces, memory, and processing circuitry. The processing circuitry is configured to execute instructions stored in the memory. The network node is configured to signal one or more rules to a wireless device. The one or more rules indicating how to allocate one or more beam-level filters of the wireless device to beamformed signals detected by the wireless device. The network node is further configured to receive a measurement that the wireless device performs based on monitoring the beamformed signals according to the allocation of the one or more beam-level filters. The network node is further configured to perform an operation based on the received measurement.

In a sixth set of embodiments, a computer program product comprises a non-transitory computer readable storage medium storing computer readable program code. The computer readable program comprises program code for signaling one or more rules to the wireless device. The one or more rules indicating how to allocate one or more beam-level filters of the wireless device to beamformed signals detected by the wireless device. The computer readable program further comprises program code for receiving a measurement that the wireless device performs based on monitoring the beamformed signals according to the allocation of the one or more beam-level filter. The computer readable program further comprises program code for performing an operation based on the received measurement.

In certain embodiments, the one or more rules are configured to cause the wireless device to perform any of the methods of Claims described above as being performed by a wireless device.

In certain embodiments, the method/network node/computer program product further comprises obtaining information of the beam measurement capabilities available at the wireless device. The one or more rules signaled to the wireless device are based on the obtained information.

In certain embodiments, the one or more rules signaled to the wireless device are based on the beamform signals being transmitted by the network.

Certain embodiments of the present disclosure may provide one or more technical advantages. For example, certain embodiments allow a wireless device to manage its beam-level filtering resources based on detected beamformed signals. The wireless device may allocate beam-level filters to a subset of the detected beamformed signals and monitor the subset of beamformed signals using the beam-level filters. The beam-level filtered values may be used to determine a cell quality of the cell serving the wireless device. As another example, certain embodiments allow a wireless device to partition available beam-level filters into one or more partitions. By partitioning the beam-level filters, the wireless device can allocate beam-level filters to certain categories of beamformed signals to ensure enough beam-filtered values for further measurements and cell-quality derivation. As yet another example, certain embodiments allow the wireless device to reallocate beam-level filters. In this manner, wireless device can continually update which beamformed signals are being allocated beam-level filters to ensure useful and accurate filtered values for further use, such as in determining a cell quality.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Beam-level quality measurements, such as RSRP/RSRQ, for a given cell should be supported in NR to enhance measurement reports and select or track beams for access to the network. In LTE, where only cell-level measurements are required, filtering is maintained per detected cell. For every sample, the UE is required to detect and maintain measurements for at least a certain number of cells. In LTE, these signals for RRM measurements and cell discovery are not beamformed (in contrast to NR) and it is very likely that over the periods across the samples, e.g., 40 ms, there will be few changes in terms of number of cells and/or the cells that are being detected and filtered. Hence, the UE can easily update its list of filters per cell. However, NR introduces unsolved problems.

Figure 1:
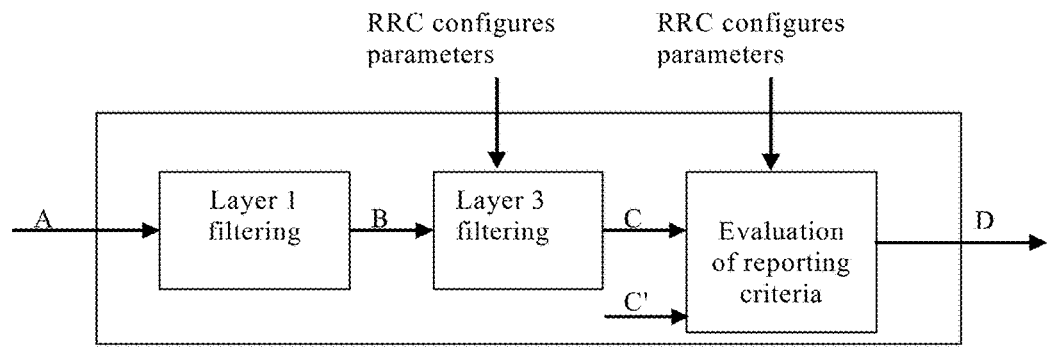
FIG. 1 illustrates an example measurement model including measurement filtering, in accordance with certain embodiments.
Figure 2:
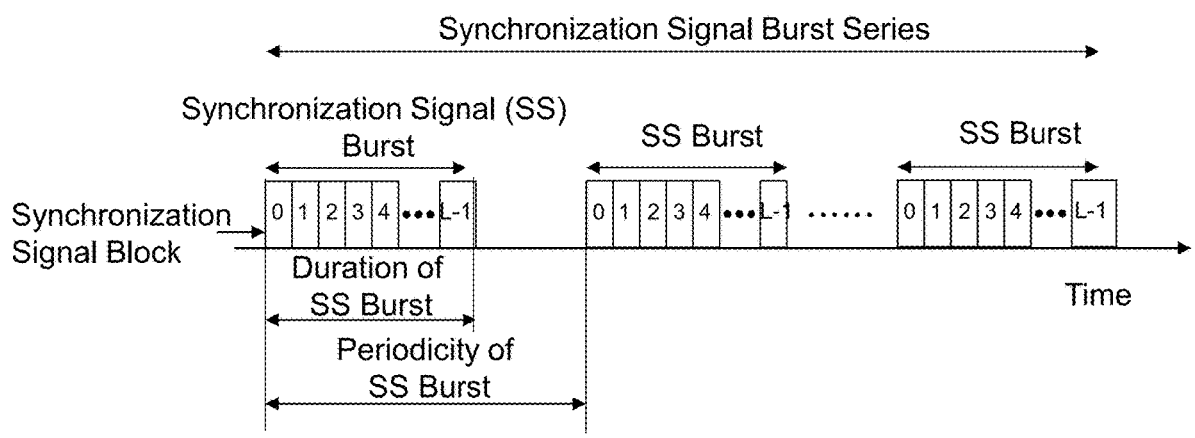
FIG. 2 illustrates an example configuration of SS blocks, SS bursts, and SS burst sets/series, in accordance with certain embodiments.
Figure 3:
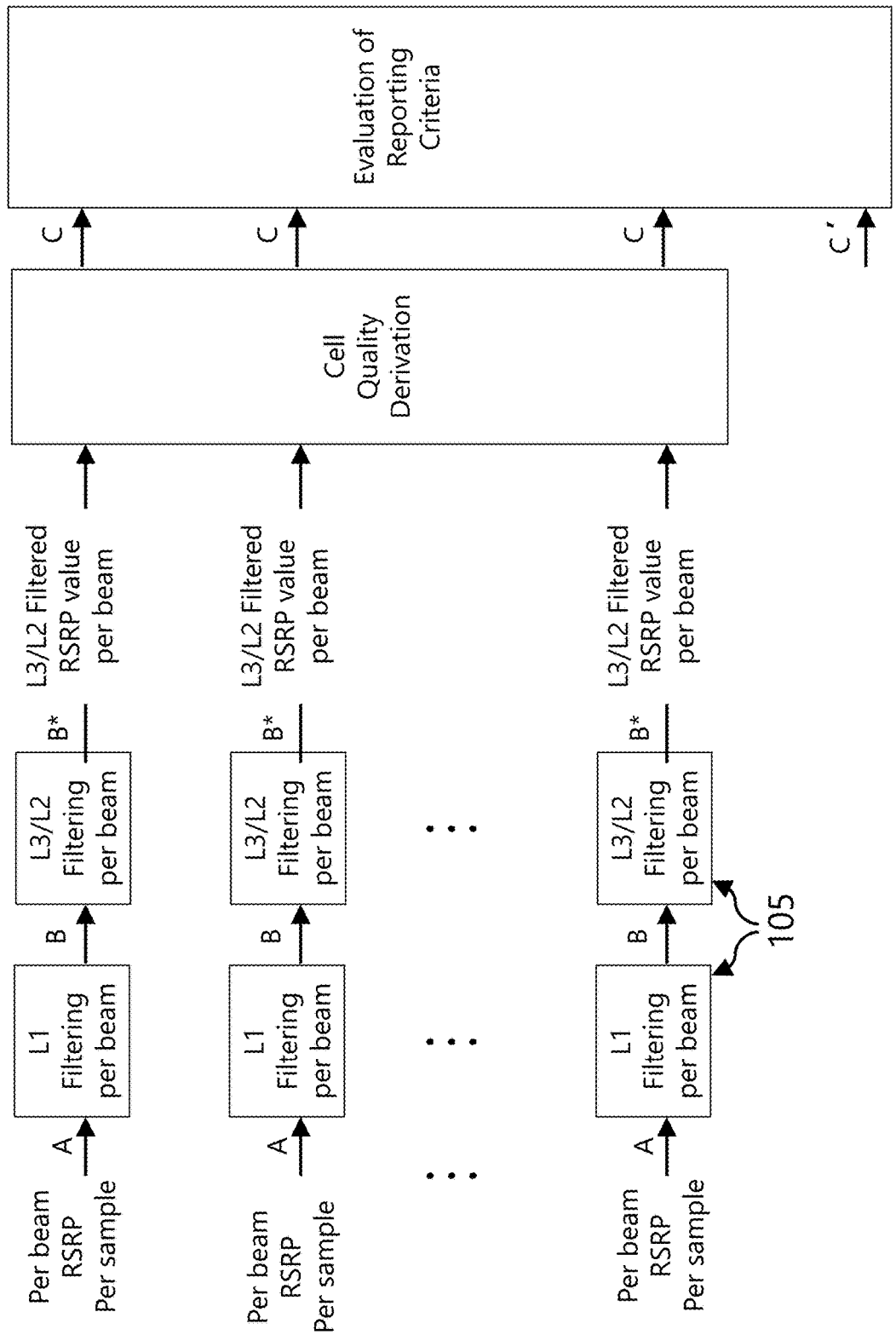
FIG. 3 illustrates an example measurement model supporting beam-level filtering, in accordance with certain embodiments.

For example, in NR, the wireless devices (e.g., UEs) will likely be required to filter RSRP measurements per beam per cell. In other words, in addition to cell level filters, the UE may be required to maintain beam-level filters. Potential measurement models have been discussed in RAN2, mainly in terms of which layer should configure these filters (L1, L2 or L3) and/or whether these should be standardized or not and/or whether cell quality derivation should occur before or after the beam level filtering. For example, FIG. 3 illustrates an example measurement model supporting beam-level filtering, in accordance with certain embodiments. In contrast with FIG. 1, FIG. 3 illustrates receiving per beam RSRP per sample at a plurality of measurement points A. The measurement model also illustrates beam-level filters 105 that may be implemented as L1 beam-level filters or L3/L2 beam level filters. Each of beam-level filters 105 may filter the per beam RSRP per sample. After beam-level filtering, each of the filtered values may be used to derive a cell quality. For example, the values at B* may be all of the filtered values of the individual beams from a single cell. Each of the B* values may be combined together to derive a cell quality. Then, similarly to FIG. 1, the model may include an evaluation of reporting criteria before reporting the cell quality.

Beam-level measurements in NR give rise to several problems. However, differently from LTE, some additional problems have been identified in NR:

1) The number and the set of detected beams per cell can change quite a lot from one sample to another;
2) The beams detected per cell (and their ranking) can change quite a lot, even if the number of detected beams remains the same;
3) The UE has limited resources in terms of filters overall, for all the cells it should perform measurements, including neighbor and serving cells. Hence, problems 1) and 2) occurring per cell, creates an additional problem and complexity issues in the UE in selecting which beam-filters to maintain per cell and how many, in that limited resource scenario.

Figure 4:
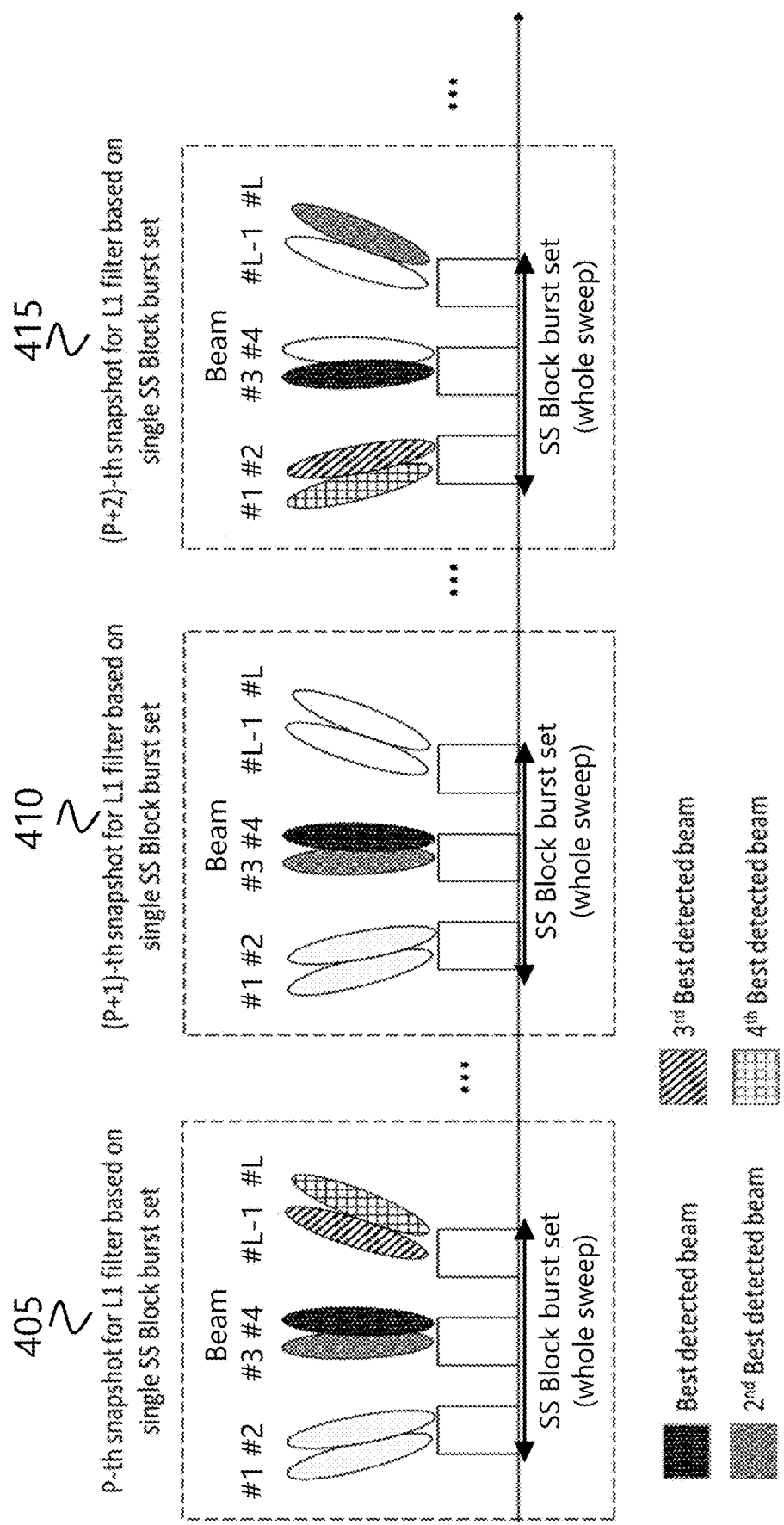
FIG. 4 illustrates a series of beam-level snapshots in a SS block burst set, in accordance with certain embodiments.

The first two problems can be illustrated with the following example. FIG. 4 illustrates a series of beam-level snapshots taken at a wireless device, in accordance with certain embodiments. At the P-th snapshot 405 the UE may detect beams #4, #3, #L−1 and #L, ordered from the strongest to the weakest. These could be beams above a certain threshold, which could be configured by the network. In the (P+1)-th snapshot 410 the UE may detect fewer beams, e.g., only #4, #3 and beams #L−1 and #L not being detected. In the (P+2)-th snapshot 415 beams #3, #L, #2, #1 may be detected. Accordingly, not only can the number of beams change from one sample to another, but beams not previously detected may be detected and the number of beams detected from snapshot to snapshot may increase. In a worst case scenario, the number of beams detected per cell can be different for every sample and always increase with each sample.

The third problem arises when the number of beams and the beams detected varies in each cell that the UE detects in a snapshot, e.g., in the case of neighbor cells. If the UE detects beams for more than one cell, the number of beams is per cell per sample. Thus, the complications may be compounded exponentially as the number of cells increases.

In LTE, the UE is required to be able to measure RSRP from at least 8 identified intra-frequency cells over the physical layer measurement period. When measurement gaps are used, and depending upon the gap periodicity, the number of measured cells may be lower than 8 due to the fact that the measurement gaps reduce the time available for the UE to make intra-frequency measurements.

Similarly, the UE is also required to measure RSRP from at least 4 identified inter-frequency cells per inter-frequency carrier for up to 3 carriers (i.e. a total of 12 inter-frequency cells).

Disclosed herein are methods and apparatuses that address the apparent problems discussed above regarding managing beam-based filters per cell to generate filtered beam-level quality values. In certain embodiments, a wireless device may dynamically allocate and reallocate filters for performing filtered beam-level quality measurement based on variation of the signal levels of the beams used for obtaining the filtered beam-level quality measurement.

Certain embodiments described below describe how the wireless device can add filters associated to new beams detected in a sample/snapshot for each detected cell, update filtered values associated to new detected beams, remove filters associated to beams that stop to be detected and manage the total number of filters for all detected cells, including the serving cell.

In certain embodiments, the beam-level filter management operation may either be implemented at the wireless device without specifications impact or it can be based on pre-defined rules which would be specified. In some embodiments, the beam-level filter management operation may also be based on rules configured by a network node, where the network node can configure the rules based on previous measurement results reported by the wireless device.

Certain embodiments comprise a self-organizing network (SON) function where the wireless device can log the changes in the number of detected beams from sample to sample, their changing in terms of ranking, the appearance and disappearance of beams, etc. These logs can be later reported (e.g. on request) from the network to tune the beam-level filter management rules at the wireless device. In the case rules are defined, these could also vary per wireless device capability.

Certain embodiments enable the wireless device to perform filtered beam-level quality measurements (e.g. RSRP/RSRQ) in an efficient way considering that the wireless device has limited resources in terms of filter capabilities and accounting for the fact that the number and the set of detectable beams in a cell may change rather frequently.

Some of the embodiments disclosed herein cover the management at the wireless device of beam-level measurement filters in a resource limited scenario. The wireless device can either implement these rules or receive them from the network.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Some of the embodiments contemplated herein will now be described more fully hereinafter with reference to the accompanying drawings. Other embodiments, however, are contained within the scope of this disclosure and the invention should not be construed as limited to only the embodiments set forth herein; rather, these embodiments are provided by way of example to convey the scope of the inventive concept to those skilled in the art. Like numbers refer to like elements throughout the description.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also, in some embodiments, generic terminology "network node", is used. It can be any kind of network node which may comprise of a radio network node such as base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node, MDT node, etc.), or even an external node (e.g., 3rd party node, a node external to the current network), etc. The network node may also comprise a test equipment.

The term "radio node" used herein may be used to denote a UE or a radio network node.

The embodiments are applicable to single carrier as well as to multicarrier or carrier aggregation (CA) operation of the UE in which the UE is able to receive and/or transmit data to more than one serving cell. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly, the secondary serving cell is interchangeably called as secondary cell (SCell) or secondary serving cell (SSC).

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "radio measurement" used herein may refer to any measurement performed on radio signals. Radio measurements can be absolute or relative. Radio measurement may be called as signal level which may be signal quality and/or signal strength. Radio measurements can be e.g. intra-frequency, inter-frequency, CA, etc. Radio measurements can be unidirectional (e.g., DL or UL) or bidirectional (e.g., RTT, Rx-Tx, etc.). Some examples of radio measurements: timing measurements (e.g., TOA, timing advance, RTT, RSTD, Rx-Tx, propagation delay, etc.), angle measurements (e.g., angle of arrival), power-based measurements (e.g., received signal power, RSRP, received signal quality, RSRQ, SINR, SNR, interference power, total interference plus noise, RSSI, noise power, etc.), cell detection or cell identification, radio link monitoring (RLM), system information (SI) reading, etc.

The term measurement performance used herein may refer to any criteria or metric which characterizes the performance of the measurement performed by a radio node.

The term measurement performance is also called as measurement requirement, measurement performance requirements etc. The radio node has to meet one or more measurement performance criteria related to the performed measurement. Examples of measurement performance criteria are measurement time, number of cells to be measured with the measurement time, measurement reporting delay, measurement accuracy, measurement accuracy with respect to a reference value (e.g. ideal measurement result) etc. Examples of measurement time are measurement period, cell identification period, evaluation period, etc.

Partitioning of Beam-Level Filter Resources

A first set of embodiments disclose different ways of partitioning the beam-level filters to be maintained at the wireless device to be used for different purposes. In certain embodiments, the UE can partition the beam-level filter resources. The partitioning can either be based on rules indicated by the network and/or defined as a function at the UE. The function in the UE can be UE implementation specific or it can be based on one or more pre-defined rules. In the case the network node indicates the partitioning, that can be done via dedicated signaling to the UE or via broadcasted information (e.g. via system information). The way the network node indicates may also depend on whether this is related to the UE capabilities or not. A filter may be characterized e.g. by a length, which in some examples may be different for serving/camping cells and neighbor cells or different for serving/camping carrier(s) and other carriers. A filter may be associated with a specific beam during some time period.

More generally, the maximum number of beam-level filters (N) to be maintained for beam-level filtering may be partitioned as, e.g.: N=sum(Ni), i=1, 2, . . . , where i may correspond to different cell and/or carrier types (e.g., serving/camping and neighbor cells; activated or deactivated cells/carriers; lower-frequency and higher-frequency carriers; etc.). The parameters N and/or Ni may be signaled by the network and/or they may be a UE capability and/or or they may be determined based on a pre-defined value or pre-defined rule (e.g., specified in a standard). They may also depend on the current available resources (e.g. processing and/or memory) in the UE. The parameters N and all Ni may apply for a carrier, in one example. In another example, N and all Ni may apply across multiple carriers operated by the UE.

In certain embodiments, the UE may not simultaneously use (e.g., may not be required to or may not support) more than Ni filters for cell(s) and/or carrier(s) for the set of cells and/or carriers i. In another example, if some of the Ni1 filters are unused, they may be allocated to another partition, e.g. Ni2, so that the total N is not exceeded.

In certain embodiments, the UE is required to be able to simultaneously use at least Ni filters for the set of cells and/or carriers i. The set of cells and/or carriers i may comprise, e.g., at least Mcells_min and/or Mcells_max cells. The set of cells and/or carriers i may comprise, e.g., at least Mcarriers_min and/or Mcarriers_max carriers.

If the measurement/filtering needs satisfy the partitioning, the UE may be further required to perform all the configured measurements, while meeting one or more pre-defined requirements (e.g., measurement period, measurement accuracy, etc.). If the filtering needs do not satisfy the partitioning (e.g., the filters demand exceeds N and/or one or more Ni), the UE may do, e.g., one or more of:

Delay the beginning of/postpone/stop/drop one or more measurements or measurement procedures (e.g., RLM, cell identification, cell measurement, beam measurement, beam management, etc.);

Reduce the set of monitored beams and/or cells to satisfy the partitioning.

While the wireless device, e.g., the UE, may partition the beam-level filters in various ways, below are several examples of sets of Ni:

N1=Nserving and N2=Nneighbors for a carrier for the serving cell and one or more neighbor cells respectively;

N1=Nserving, N2=Nneighbor1, N3=Nneighbor2, . . . for a carrier for the serving cell and each neighbor cell respectively (N2, N3, etc. may or may not be the same), e.g., N1=5 and N2=N3=1;

N1=Nserving and N2=Nneighbors for multiple carriers (UE may have multiple serving carriers, a.k.a. carrier components, in CA or with dual connectivity), where Nserving may relate to serving cells and Nneighbors may relate to non-serving cells on a serving or non-serving carrier, or Nserving may relate to cells on serving carriers and Nneighbors may relate to cells on non-serving carriers;

N1=Ncamping and N2=Nneighbors for a carrier

N1=Ncamping, N2=Nneighbor1, N3=Nneighbor2, . . . for a carrier

N1=Ncamping, N2=Nneighbors, . . . for multiple carriers

N1=Ncamping, N2=Nneighbor1, N3=Nneighbor2, . . . for multiple carriers

Figures 5A, 5B:
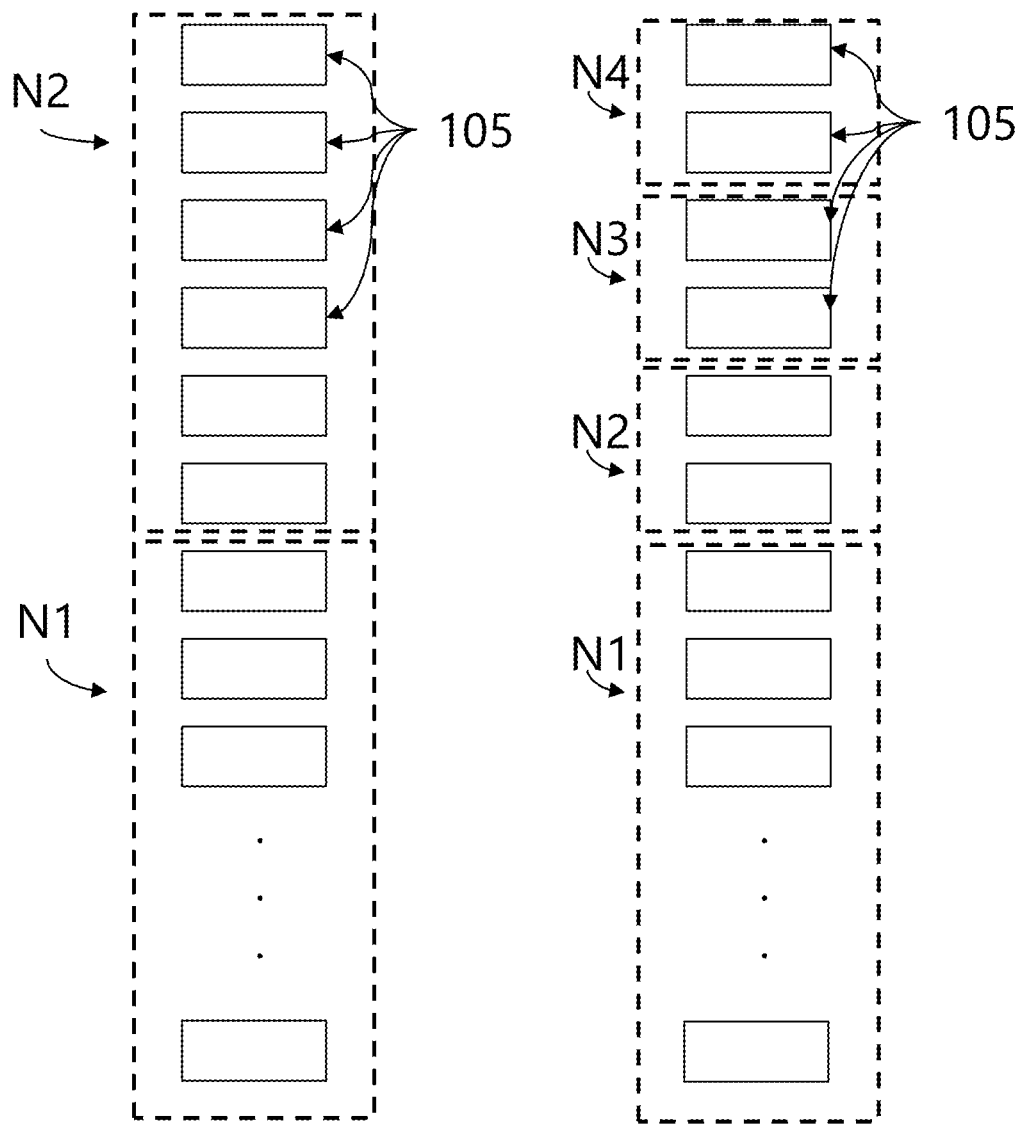
FIGS. 5A and 5B illustrate example partitions of filters at the wireless device for beam-level filtering, in accordance with certain embodiments.

FIGS. 5A and 5B illustrate example partitions by the wireless device of beam-level filters 105. FIG. 5A illustrates a partition of beam level filters 105 into partition N1 and partition N2. For example, N1 may be a partition of beam-level filters for filtering beams from a carrier for the serving cell and N2 may be a partition of beam-level filters for filtering beams from the carrier for the one or more neighbor cells. FIG. 5B illustrates a partition of beam level filters 105 into partitions N1-N4. As an example, partition N1 can be the same as partition N1 of FIG. 5A. However, instead of partition N2 for all of the neighbor cells, partitions N2-N4 may be dedicated to a single neighbor cell. The number of beam-level filters 105 allocated to each partition may be different or the same. For example, N1 may equal N2 in the example of FIG. 5A. As another example, N1 may be different from N2-4 in FIG. 5B, but N2, N3, and N4 may be the same.

In certain embodiments, the maximum number of beam level filters (N) to be maintained for the serving cell and neighbor cells are partitioned according to a rule, e.g., N=Nserving+Nneighbors, for an RRC_CONNECTED UE, where there are dedicated Nserving filters for the serving cell(s) or dedicated Nserving filters for the serving carriers (a serving carrier may comprise a serving cell and neighbor cells). These filters dedicated for serving cell operation can be used, for example, for beam recovery where the UE should send an UL signal (e.g. scheduling request over PUCCH and/or PRACH or PRACH-like preamble) associated to the best DL beam (where associated means having as time reference and/or having a preamble that indicates to the network the best DL beam to either send the response and/or schedule the UE with PDCCH over that beam). This can also be used for radio link failure recovery still within the same cell. The best DL beam can be the one which has the highest signal quality compared to the signal quality of other beams.

In certain embodiments, when N, Nserving and Nneighbors are defined per carrier, Nserving may be greater than zero for a serving carrier (or carrier component, CC) and N(serving) is equal to zero for a non-serving carrier. In some embodiments, N(neighbors) may also depend on whether the carrier is serving or not.

In certain embodiments, at least one of N(serving) and N(neighbors) may be different depending on whether the serving cell is activated or not on the corresponding carrier. In certain embodiments, N(serving) and N(neighbors) do not depend on the activation status of the serving cell on the corresponding carrier.

In certain embodiments, N(serving) may apply to activated serving carrier(s) only. In other embodiments, N(serving) may apply to serving carrier(s) disregard of whether it is activated or deactivated.

In certain embodiments, the maximum number of beam level filters to be maintained for the cell the UE is camping on and neighbor cells are partitioned according to a rule, e.g., N=Ncamping+Nneighbors for an RRC_IDLE and/or RRC_INACTIVE UE. The rule may be used to select DL beams to perform random access when the UE should perform a transition to RRC_CONNECTED.

In certain embodiments, the UE in RRC_INACTIVE or RRC_IDLE always uses all filters for the cell that it is camping.

In certain embodiments, the UE in RRC_INACTIVE or RRC_IDLE has a maximum number of filters that can be used for the cell that it is camping.

In certain embodiments, the UE has information about the number of beams (e.g., a Ncell quality) that may be used by the UE to compute their respective cell quality values. The number of beams may be configured per carrier frequency. Accordingly, the partitioning of beam-level filters may be maintained per cell per carrier. For example, for a given carrier where Ncell quality=5, the UE can reserve 5 filters per cell.

Using Beam-Level Filters in a Cell

Certain embodiments address different ways of using the number of beam-level filters per cell. The UE has a limited number of resources in terms of beam-level filters and a different number of beams can appear and disappear per cell per sample or can be detected or cannot be detected per cell or can be above or below a threshold. The UE may manage the number of beam-level filters to be maintained per neighbor cell and the filter updating procedures.

If not all the filters are used, the UE may reallocate the available filtering resources. The reallocation may be based on different criteria, e.g., one or more of:

Increasing further the number of tracked beams by certain margin (e.g. by 3 beams) in a cell where the filtering resources are already fully used according to the partition, Assigning a filter to a beam whose signal level (e.g. signal quality and/or signal strength) estimated by the UE is above a certain signal level threshold (e.g. X1 dB or X2 dBm) over at least certain period of time (T0).

Not assigning a filter to a previously detected beam whose signal level (e.g. signal quality and/or signal strength) estimated by the UE falls below a signal level threshold (e.g. X3 dB or X4 dBm) over at least certain period of time (T1). In this case the UE may be allowed to extend a basic or reference measurement period by certain margin e.g. from T11 to T12 where T12>T11 and T11 is basic measurement period over which the UE is required to perform the measurement.

Not assigning a filter to a previously detected beam whose signal level (e.g. signal quality and/or signal strength) estimated by the UE falls below a signal level threshold (e.g. X3 dB or X4 dBm) over G1 consecutive measurement occasions or instances or opportunities. In each measurement occasion the UE obtains a measurement sample (aka measurement snapshot).

Assuming a partitioning of filters between neighbor and serving cells, the UE may detect K neighbor cells (1, 2, . . . , K) and for each of these cells, the UE may compute the cell quality based on the samples obtained for each of the detected cells. If all beams associated to all cells do not exceed the number of filters the UE can allocate all filters to all cells for all detectable beams.

In certain embodiments, the UE begins allocating the filters from the best cell (aka strongest cell, e.g., in terms of highest signal quality in all cells) to the weakest cell (e.g., whose signal quality is X dB below that of the best cell) or relatively weaker cell. The aim of this approach is to maximize the total number of tracked beams in maximum number of the best cells. In this case the UE may assign filters to those beams (of the weaker cell) whose signal levels (e.g. signal quality) are above certain threshold. This method can be triggered by the UE based on signal level of the best cell and/or signal level of the weaker cells. For example, when signal level (e.g. SINR, RSRQ etc.) of the best cell becomes larger than certain threshold then the UE may reallocate a certain number of filters (e.g. 20%) to one or more weaker cells. In yet another example, when signal level (e.g. SINR, RSRQ etc.) of the best cell becomes larger than certain threshold (H1) and signal level (e.g. SINR, RSRQ etc.) of at least one weaker cell falls below certain threshold (H2) then the UE may reallocate a certain number of filters (e.g. 20%) to one or more weaker cells.

In certain embodiments, the UE allocates beam-based filters for generating filtered beam-level quality values to different cells in the order of their signal quality. For example, the UE allocates the filters to different cells in terms of the decreasing order of the cell signal level. For example, the UE first allocates filters for the beam quality measurement on the best cell and has a defined cap in terms of filtered allocated for one cell (max number of filters per cell). In some embodiments, a cell whose signal level is highest compared to other cells is considered to be the best cell (aka strongest cell). Once the cap in terms of maximum allowed filters is reached for the best cell then the UE starts to allocate filters for the N−1 best cells, which can also have their own cap. The process may continue until all of the available filters at the UE are allocated. In one example, all cells have the same cap of a number of filters. In another example, each cell is associated with a different cap. For example, the strongest cell may have a larger cap compared to the weaker cell. In yet another example, particular types of cell(s) may have larger cap of filters compared to other types of cells. For example, types of cells having larger caps may include a serving cell (e.g. PCell, SCell etc.), a cell operating on a particular frequency or frequency band, etc. The specific cell(s) with certain caps may also be configured by the network node at the UE. For measurements on such cell the UE may have to assign larger number of filters (e.g. maximum number of filters or number of filters above certain threshold).

Figure 6:
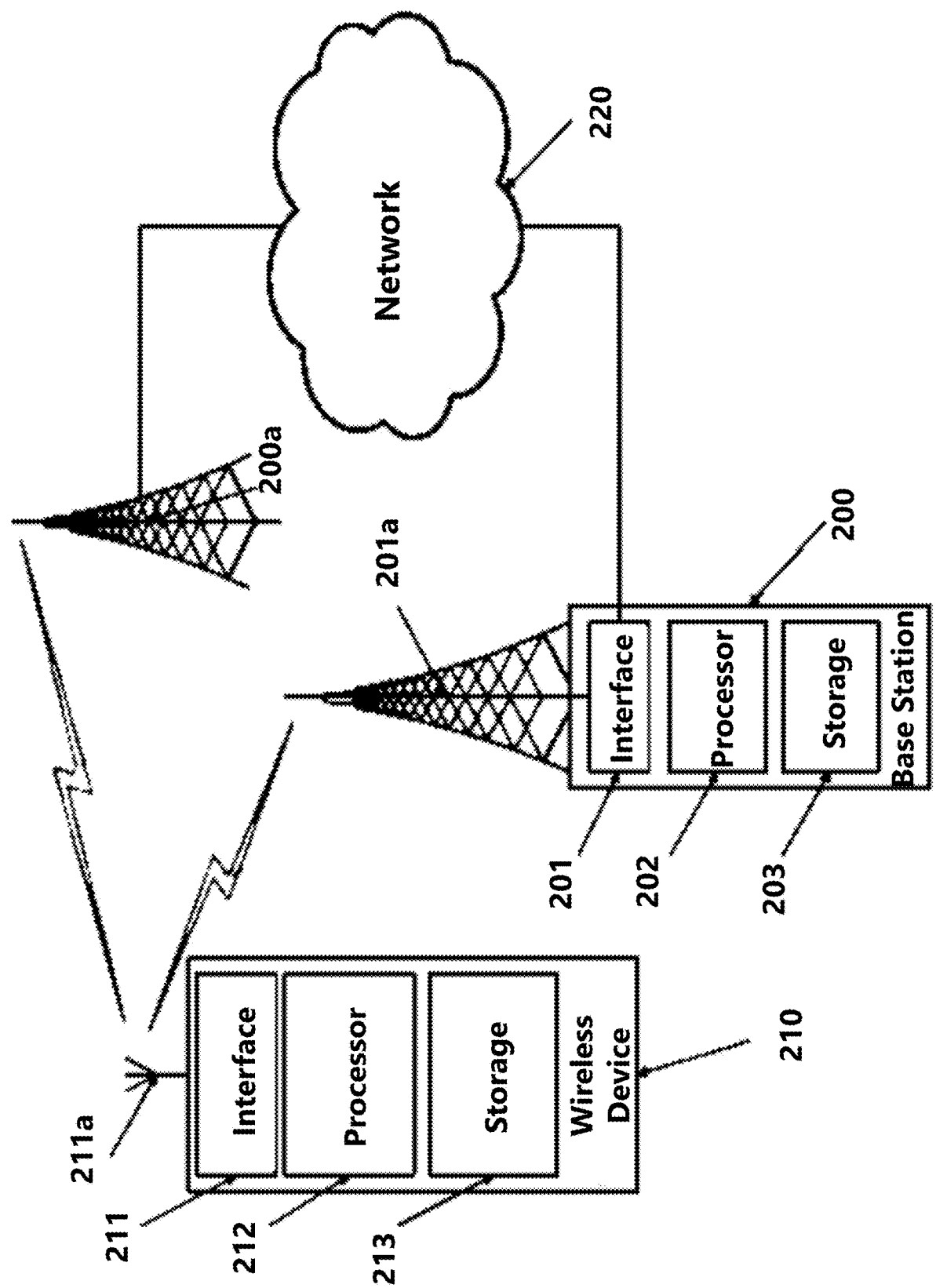
FIG. 6 is a block schematic illustrating an example network, in accordance with certain embodiments.

Although the solutions described above may be implemented in any appropriate type of system using any suitable components, particular embodiments of the described solutions may be implemented in a wireless network such as the example wireless communication network illustrated in FIG. 6. In the example embodiment of FIG. 6, the wireless communication network provides communication and other types of services to one or more wireless devices. In the illustrated embodiment, the wireless communication network includes one or more instances of network nodes that facilitate the wireless devices' access to and/or use of the services provided by the wireless communication network. The wireless communication network may further include any additional elements suitable to support communication between wireless devices or between a wireless device and another communication device, such as a landline telephone.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

FIG. 6 illustrates a wireless network comprising a more detailed view of network node 200 and wireless device (WD) 210, in accordance with a particular embodiment. For simplicity, FIG. 6 only depicts network 220, network nodes 200 and 200a, and WD 210. Network node 200 comprises processor 202, storage 203, interface 201, and antenna 201a. Similarly, WD 210 comprises processor 212, storage 213, interface 211 and antenna 211a. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device access to the wireless communication network or to provide some service to a wireless device that has accessed the wireless communication network.

As used herein, the term "radio node" is used generically to refer both to wireless devices and network nodes, as each is respectively described above.

In FIG. 6, Network node 200 comprises processor 202, storage 203, interface 201, and antenna 201a. These components are depicted as single boxes located within a single larger box. In practice however, a network node may comprise multiple different physical components that make up a single illustrated component (e.g., interface 201 may comprise terminals for coupling wires for a wired connection and a radio transceiver for a wireless connection). As another example, network node 200 may be a virtual network node in which multiple different physically separate components interact to provide the functionality of network node 200 (e.g., processor 202 may comprise three separate processors located in three separate enclosures, where each processor is responsible for a different function for a particular instance of network node 200). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201a may be shared by the RATs). Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless device, such as WD 210, including any of the features or benefits disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. Storage 203 may be used to store any calculations made by processor 202 and/or any data received via interface 201.

Network node 200 also comprises interface 201 which may be used in the wired or wireless communication of signaling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or WDs via a wireless connection. The radio may convert the digital data into a radio signal having the appropriate channel and bandwidth parameters. The radio signal may then be transmitted via antenna 201a to the appropriate recipient (e.g., WD 210).

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" (WD) refers to a device capable, configured, arranged and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support device-to-device (D2D) communication, for example by implementing a 3GPP standard for sidelink communication, and may in this case be referred to as a D2D communication device.

As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 6, WD 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200 and/or other WDs. WD 210 comprises processor 212, storage 213, interface 211, and antenna 211a. Like network node 200, the components of WD 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. Storage 213 may be used to store any calculations made by processor 212 and/or any data received via interface 211.

Interface 211 may be used in the wireless communication of signaling and/or data between WD 210 and network node 200. For example, interface 211 may perform any formatting, coding, or translating that may be needed to allow WD 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

Figure 7:
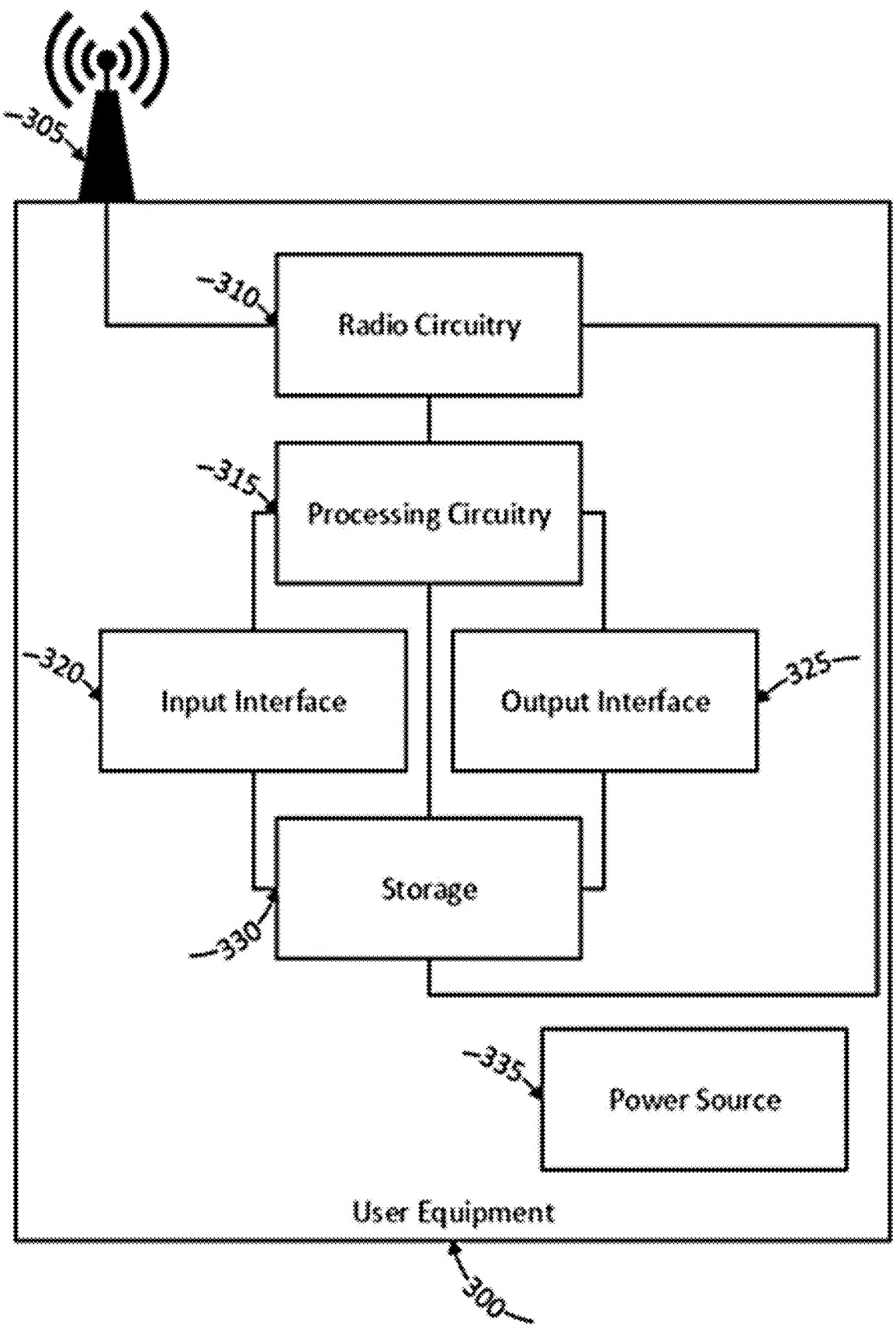
FIG. 7 is a block schematic of an exemplary wireless device, in accordance with certain embodiments.

As shown in FIG. 7, user equipment 300 is an example wireless device. UE 300 includes an antenna 305, radio front-end circuitry 310, processing circuitry 315, and a computer-readable storage medium 330. Antenna 305 may include one or more antennas or antenna arrays, and is configured to send and/or receive wireless signals, and is connected to radio front-end circuitry 310. In certain alternative embodiments, wireless device 300 may not include antenna 305, and antenna 305 may instead be separate from wireless device 300 and be connectable to wireless device 300 through an interface or port.

The radio front-end circuitry 310 may comprise various filters and amplifiers, is connected to antenna 305 and processing circuitry 315, and is configured to condition signals communicated between antenna 305 and processing circuitry 315. In certain alternative embodiments, wireless device 300 may not include radio front-end circuitry 310, and processing circuitry 315 may instead be connected to antenna 305 without radio front-end circuitry 310.

Processing circuitry 315 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 315 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 315 executing instructions stored on a computer-readable storage medium 330. In alternative embodiments, some or all of the functionality may be provided by the processing circuitry 315 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 315 alone or to other components of UE 300, but are enjoyed by the wireless device as a whole, and/or by end users and the wireless network generally.

Antenna 305, radio front-end circuitry 310, and/or processing circuitry 315 may be configured to perform any receiving operations described herein as being performed by a wireless device. Any information, data and/or signals may be received from a network node and/or another wireless device.

The processing circuitry 315 may be configured to perform any determining operations described herein as being performed by a wireless device. Determining as performed by processing circuitry 315 may include processing information obtained by the processing circuitry 315 by, for example, converting the obtained information into other information, comparing the obtained information or converted information to information stored in the wireless device, and/or performing one or more operations based on the obtained information or converted information, and as a result of said processing making a determination.

Antenna 305, radio front-end circuitry 310, and/or processing circuitry 315 may be configured to perform any transmitting operations described herein as being performed by a wireless device. Any information, data and/or signals may be transmitted to a network node and/or another wireless device.

Computer-readable storage medium 330 is generally operable to store instructions, such as a computer program, software, an application including one or more of logic, rules, code, tables, etc. and/or other instructions capable of being executed by a processor. Examples of computer-readable storage medium 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 315. In some embodiments, processing circuitry 315 and computer-readable storage medium 330 may be considered to be integrated.

Alternative embodiments of UE 300 may include additional components shown in FIG. 7 or beyond those shown in FIG. 7 that may be responsible for providing certain aspects of the UE's functionality, including any of the functionality described herein and/or any functionality necessary to support the solution described above. As just one example, UE 300 may include input interfaces, devices and circuits, an example of which is illustrated by input interface 320 in FIG. 7, and output interfaces, devices and circuits, an example of which is illustrated by output interface 325 in FIG. 7. Input interfaces, devices, and circuits are configured to allow input of information into UE 300, and are connected to processing circuitry 315 to allow processing circuitry 315 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 300, and are connected to processing circuitry 315 to allow processing circuitry 315 to output information from UE 300. For example, output interfaces, devices, or circuits may include a speaker, a display, vibrating circuitry, a USB port, a headphone interface, or other output elements. Using one or more input and output interfaces, devices, and circuits, UE 300 may communicate with end users and/or the wireless network, and allow them to benefit from the functionality described herein.

As another example, UE 300 may include power source 335. Power source 335 may comprise power management circuitry. Power source 335 may receive power from a power supply, which may either be comprised in, or be external to, power source 335. For example, UE 300 may comprise a power supply in the form of a battery or battery pack which is connected to, or integrated in, power source 335. Other types of power sources, such as photovoltaic devices, may also be used. As a further example, UE 300 may be connectable to an external power supply (such as an electricity outlet) via an input circuitry or interface such as an electrical cable, whereby the external power supply supplies power to power source 335. Power source 335 may be connected to radio front-end circuitry 310, processing circuitry 315, and/or computer-readable storage medium 330 and be configured to supply UE 300, including processing circuitry 315, with power for performing the functionality described herein.

UE 300 may also include multiple sets of processing circuitry 315, computer-readable storage medium 330, radio circuitry 310, and/or antenna 305 for different wireless technologies integrated into wireless device 300, such as, for example, GSM, WCDMA, LTE, NR, Wi-Fi, or Bluetooth wireless technologies. These wireless technologies may be integrated into the same or different chipsets and other components within wireless device 300.

Figure 8:
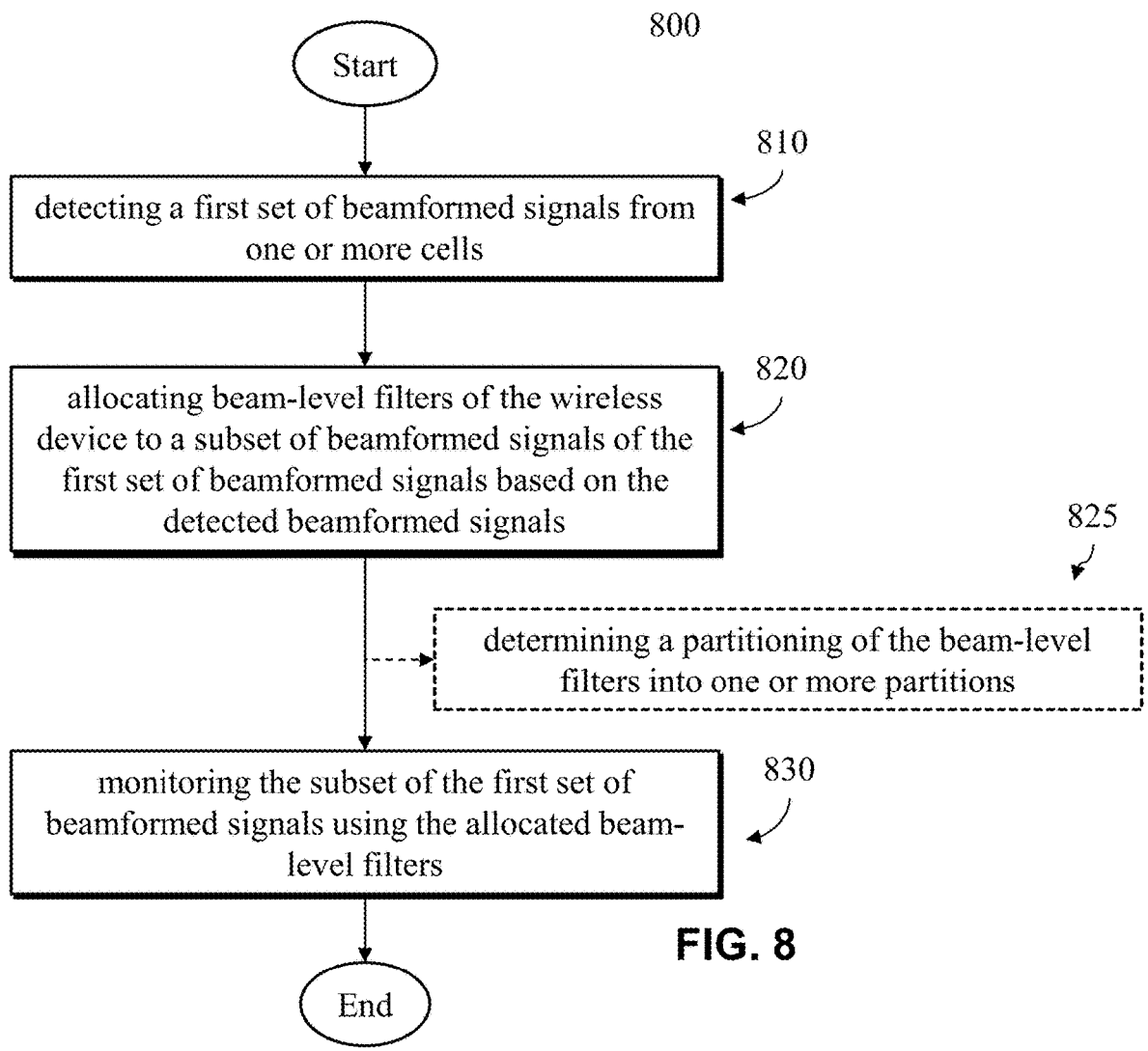
FIGS. 8-10 are flow diagrams, each illustrating an example method in a wireless device, in accordance with certain embodiments.
Figure 9:
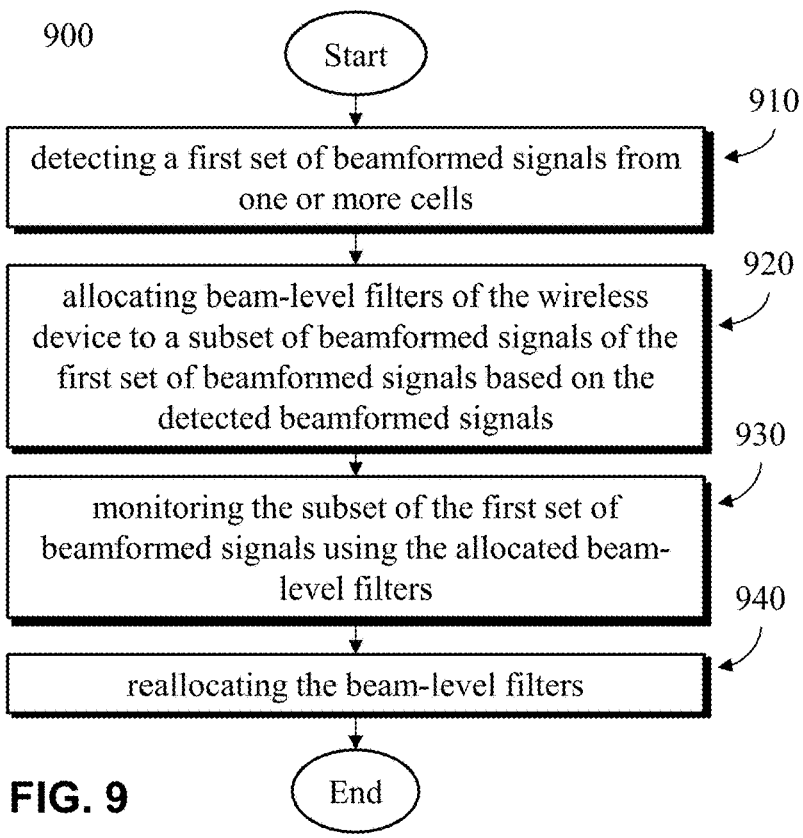
Figure 10:
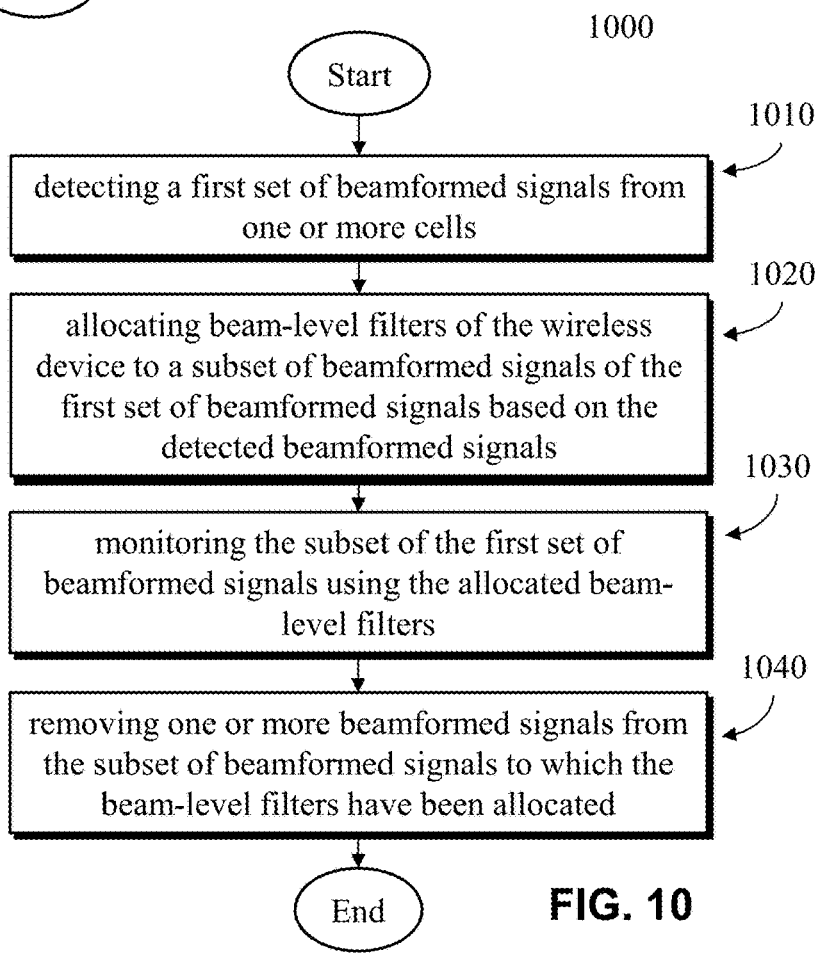

FIGS. 8-10 are flow diagrams, each illustrating an example method 800 in a wireless device, such as wireless device 210, 300, in accordance with certain embodiments. FIG. 8 illustrates an example method in wireless device 210, 300. At step 810, wireless device 210, 300 detects a first set of beamformed signals from one or more cells. For example, wireless device may take a snap shot in which a certain number of beams are detected.

At step 820, wireless device 210, 300 allocates beam-level filters of the wireless device to a subset of beamformed signals of the first set of beamformed signals based on the detected beamformed signals. For example, wireless device 210, 300 may allocate beam-level filters to all of the detected beams. As another example, wireless device 210, 300 may not have available sufficient beam-level filters to allocate a beam-level filter for each detected beam. In some embodiments, there is a maximum number (N) of beam-level filters available to be allocated to monitor beamformed signals. In some embodiments, wireless device 210, 300 may prioritize to which beams a beam-level filter may be allocated. To which beams a beam-level filter may be allocated may be based on the cell, carrier, type of cell, type of carrier, previous measurements of the beam, etc. In some embodiments, the beam-level filters allocated are one or more of L1 beam-level filters and L3 beam-level filters. In some embodiments, allocating the beam-level filters is based on the number of beams required to be monitored to compute a cell quality for each of the cells serving wireless device 210, 300.

At step 830, wireless device 210, 300 monitors the subset of the first set of beamformed signals using the allocated beam-level filters. For example, wireless device 210, 300 may filter measured values of the beams in the subset of the first set of beamformed signals using the allocated beam-level filters. The filtering may occur in level 1, level 2, or level 3. For example, the beam-level filters allocated may be L1 filters. In another example, the beam-level filters are L3 filters. In some embodiments, the filtered values may be used to derive a cell quality of the cell to which the beams belong. In some specific embodiments, wireless device 210, 300 reports, to a network node, the computed cell quality based on the monitored beamformed signals for each cell that is detected. In certain embodiments, the method further comprises further associating one of the beam-level filters with one of the beamformed signals in the first set of beamformed signals for a predetermined time period. In this manner, wireless device 210, 300 may forward measurements of the respective beamformed signal to the allocated beam-level filter to determine the cell quality using filtered values over that period of time.

In certain embodiments, method 800 may include option steps and/or substeps. In certain embodiments, step 820 includes optional substep 825. At substep 825, wireless device 210, 300 determines a partitioning of the beam-level filters into one or more partitions ($N_i$). For example, before allocating available beam-level filters, wireless device 210, 300 may determine a partition based on one or more characteristics associated with the beamformed signals. In some embodiments, each of the one or more partitions is associated with a cell, carrier, reference signal, or carrier type. For example, each partition may be associated with a different cell or a different carrier within a particular cell. The partitions may reflect sub-partitions, e.g., further divisions within a cell or carrier type. In some embodiments, the one or more partitions $N_i$ comprise a first partition associated with a serving or camping cell of the one or more cells and a second partition associated with one or more neighbor cells of the one or more cells. In some embodiments, the one or more partitions $N_i$ comprise a first partition associated with a serving or camping cell of the one or more cells and a plurality of partitions, each associated with a respective neighbor cell of the one or more cells. In some embodiments, the sum of the partitions $N_i$ equals a maximum number N of beam-level filters available to be allocated to monitor beamformed signals.

In certain embodiments, wireless device 210, 300 allocates the beam-level filters based on certain rules. In some embodiments the rules are received from a network to which the wireless device is connected. In some embodiments the rules are determined by the wireless device.

In certain embodiments, wireless device 210, 300 allocates a respective one of the beam-level filters is further based on a characteristic of the respective beam-level filter. For example, certain filters may be better equipped to filter measurements for particular types or categories of beamformed signals. Wireless device 210, 300 may then, allocate filters to better match the type of beamformed signals. In this manner, a more efficient use of beam-level filtering capabilities at wireless device 210, 300 may be provided.

In certain cases, the number of beamformed signals to be monitored to determine cell quality exceeds the filtering capabilities of the wireless device. In certain embodiments, wireless device 210, 300 delays measurement of the first set of beamformed signals if the number of beam-level filters required to monitor the determined subset of the first set of beamformed signals is greater than the number of beam-level filters allocated to the subset of the first set of beamformed signals.

Given a subset of beamformed signals to monitor, a maximum number of beam-level filters may be determined. For example, method 800 may further comprise the step of determining a maximum number of beam-level filters to allocate to the subset of beamformed signals of the first set based on a maximum number of beam level filters to be allocated to each of one or more serving or camping cells and a maximum number of beam-level filters to be allocated to each of one or more neighbor cells. In some embodiments, the maximum number of beam-level filters for the one or more serving cells or one or more neighbor cells is defined per carrier on the network. In some embodiments, at least one of the maximum number of beam level filters to be allocated to each of one or more serving cells is based on whether the respective serving cell is activated on the corresponding carrier. In some embodiments, if the wireless device is idle, the maximum number of beam-level filters to be allocated to each of the one or more neighbor cells is zero.

In certain embodiments, the number of beam-level filters allocated to the subset of beamformed signals of the first set of beamformed signals is less than a number of beam-level filters available at the wireless device. In some embodiments, method 800 further comprises adding one or more beamformed signals of the one or more cells to the subset of the first set of beamformed signals. For example, if a beam-level filter is available, it may be allocated to a beam that had previously been ignored or not allocated a beam-level filter for measurement. In this manner, wireless device 210, 300 may utilize more of its available resources.

In certain embodiments, allocating beam-level filters is based on the characteristics of the detected beams. For example, according to certain embodiments, method 800 further comprise allocating a beam-level filter to a detected signal of the first set of beamformed signals when the detected signal has a signal level above a predetermined signal level threshold over a predetermined period of time. In some embodiments, allocating the beam-level filters is further based on the cell quality of each of the one or more cells. For example, more beam-level filters may be allocated to beams from a cell having a strong cell quality. As another example, less filters may be allocated to beams from strong cell quality cell in order to better estimate the quality of lower quality cells.

In certain embodiments, allocating the beam-level filters is further based on the relative signal strength of detected beamformed signals of the first set of beamformed signals for each cell of the one or more cells. In some embodiments, allocating the beam-level filters comprises allocating the beam-level filters to a first cell having a best cell quality of the one or more cells before allocating to any other cell of the one or more cells.

In certain embodiments, beam-level filters are allocated by cell. For example, in certain embodiments, beam-level filters are allocated to the first cell until a predetermined number of beam-level filters are allocated to the first cell. Further, allocating the beam-level filters comprises allocating the beam-level filters to a second cell having a second-best cell quality of the one or more cells before allocating to any other cell of the one or more cells other than the first cell. In this manner, beam-level filters may be allocated to ensure that the cell quality may be measured at the strongest or best cells even if there are a limited number of filters available for beam-level filtering.

In certain embodiments, method 800 may further comprise the step of communicating a beam measurement capability of the wireless device to a network node. For example, wireless device 210, 300 may communicate its beam measurement capability to a network node. The network node may then respond with rules for allocating beam-level filters at the wireless device to ensure the proper measurements and reporting are provided to the network serving wireless device 210, 300. In some embodiments, communicating the beam measurement capability comprises communicating a beam filtering capability of the wireless device. For example, wireless device 210, 300 may indicate to the network node how many, what type, etc. beam filters are available for beam-level measurement at wireless device 210, 300. Wireless device may provide further information about wireless device 210, 300 and its radio environment, which may be further used by the network node to provide rules for beam-level filtering at wireless device 210, 300.

FIG. 9 illustrates another example method 900 in wireless device 210, 300. Steps 910, 920, and 930 may correspond to steps 810, 820, 830 of method 800 described above. Method 900 may further comprise step 940. At step 940, wireless device 210, 300 may reallocate the beam-level filters. For example, beam-level filters may be reassigned to different beamformed signals. Reallocating the beam-level filters may be done according to any of the embodiments described in allocating the beam level filters, such as those described in connection with step 820 of method 800.

In certain embodiments, method 900 further comprises the step of detecting a second set of beamformed signals. The second set of beamformed signals is not the same as the first set of beamformed signals. Reallocation in step 940 may be based on the differences between the first set of beamformed signals and the second set of beamformed signals. For example, wireless device 210, 300 may receive different beamformed signals at different times, e.g., due to movement of wireless device 210, 300 or a change in the radio environment or traffic. To efficiently allocate the limited resources, wireless device 210, 300 may then reallocate the beam-level filters to beamformed signals that are more relevant to the cell quality at this particular instant. For example, if wireless device 210, 300 no longer receives certain beams, it may unallocated beam-level filters associated with those beams and then reallocate the beam-level filters to other beams, such as preexisting beams that are continuing to be detected or new beams detected at wireless device 210, 300.

In certain embodiments, reallocation of beam-level filters may be based on a change of characteristics of the cell from which the beamformed signals originate. For example, if a cell has a signal strength exceeding a predetermined threshold, certain beam-level filters assigned to beamformed signals from that cell may be reallocated for filtering measurements from beams from other cells. In this manner, wireless device 210, 300 may optimize its use of its beam-level filters for measuring the quality of multiple cells.

FIG. 10 illustrates yet another example method 1000 in wireless device 210, 300. Steps 1010, 1020, and 1030 may correspond to steps 810, 820, 830 of method 800 described above. Method 1000 may further comprise step 1040. At step 1040, wireless device 210, 300 may remove one or more beamformed signals from the subset of beamformed signals to which the beam-level filters have been allocated. For example, a beamformed signal may be absent from following snap shots at wireless device 210, 300 and wireless device 210, 300 may remove that beamformed signal to make room for allocating another beamformed signal to a beam-level filter. In this manner, wireless device 210, 300 may continue to manage the beamformed signals it is using to determine cell quality values.

In certain embodiments, removing a beamformed signal from the first subset is based on the signal level of the beamformed signal. For example, a beamformed signal may be removed if it has a signal level below a predetermined signal level threshold over a predetermined period of time. The signal level may indicate that the particular beam is no longer useful for determining the cell quality or it is no longer accessible. In certain embodiments, a beamformed signal is removed if it has a signal level below a predetermined signal level threshold for a predetermined number of occasions of measurement.

Figure 11:
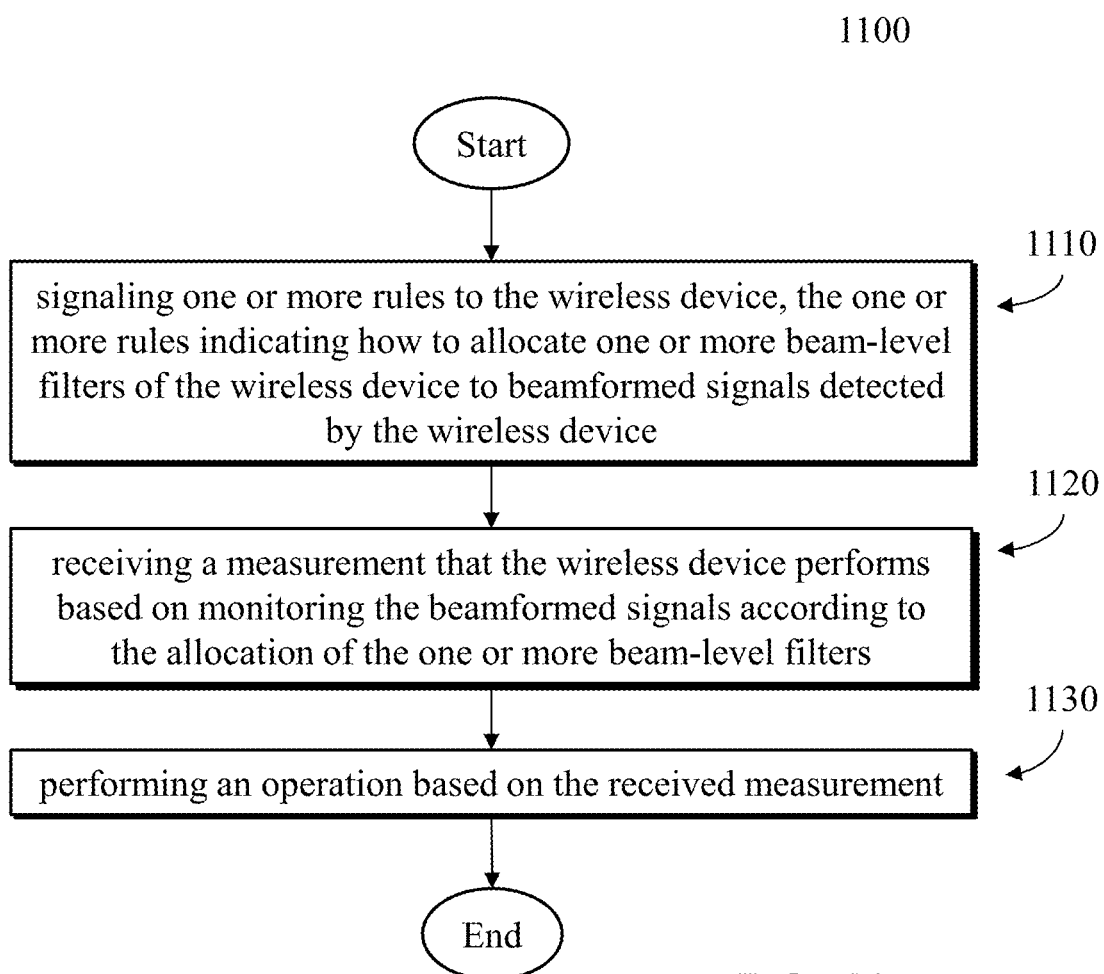
FIG. 11 is a flow diagram of a method in a network node, in accordance with certain embodiments.

FIG. 11 is a flow diagram illustrating an example method 1100 in a network node, such as network node 200, in accordance with certain embodiments. At step 1110, network node 200 may signal one or more rules to a wireless device, e.g., wireless device 210, 300. The one or more rules may indicate how to allocate one or more beam-level filters of the wireless device to beamformed signals detected by the wireless device. For example, the one or more rules may cause wireless device 210, 300 to perform according to any of the above-embodiments, including in accordance with methods 800, 900, and 1000.

At step 1120, network node 200 receives a measurement that wireless device 210, 300 performs based on monitoring the beamformed signals according to the allocation of the one or more beam-level filters. At step 1130, network node 200 performs an operation based on the received measurement. For example, network node 200 may receive a measurement of the cell quality of a cell at wireless device 210, 300. Based on the cell quality, network node 200 may change one or more parameters at network node 200, such as one or more beamforming parameters. As another example, network node 200 may report the measurement to another node within network 220.

In certain embodiments, method 1100 may comprise additional steps. For example, method 1100 may further comprise comprising obtaining information of the beam measurement capabilities available at the wireless device. The one or more rules signaled to the wireless device may are based on the obtained information. For example, there may be certain rules better adapted for the particular capabilities of a wireless device. In certain embodiments, the one or more rules signaled to the wireless device are based on the beamform signals being transmitted by the network. For example, what beamformed signals transmitted by network 220 may change how a wireless device prioritizes or partitions its available beam-level filtering resources. In this manner, network node 200 may facilitate the optimal application of wireless device 210, 300's beam-level filtering resources.

In certain embodiments, the methods described in FIGS. 8-10 may be performed by wireless device 210, 300 of FIGS. 6 and 7. For example, processing circuitry 315 can be configured to cause wireless device 210, 300 to carry out the steps of any of methods 800, 900, and 1000. In certain embodiments, the method described in FIG. 11 may be performed by network node 200 illustrated in FIG. 7. For example, processing circuitry 202 can be configured to cause network node 200 to carry out the steps of method 1100.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, storage 203 may comprise computer readable means on which a computer program can be stored. The computer program may include instructions which cause processor 202 (and any operatively coupled entities and devices, such as interface 201 and storage 203) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method in a wireless device comprising:
   determining a partitioning of beam-level filters of the wireless device into partitions, wherein the partitioning indicates how many of the beam-level filters to allocate to a first category of beamformed signals and how many of the beam-level filters to allocate to a second category of beamformed signals based on a determination that a number of beamformed signals detected for monitoring exceeds filtering capabilities of the wireless device;
   detecting a first set of beamformed signals from one or more cells;
   allocating the beam-level filters of the wireless device to a subset of beamformed signals of the first set of beamformed signals based on the partitioning and the detected beamformed signals; and
   monitoring the subset of the first set of beamformed signals using the allocated beam-level filters.

2. A computer program product comprising a non-transitory computer readable storage medium storing computer readable program code, the computer readable program code comprising:
   program code for determining a partitioning of beam-level filters of a wireless device into partitions, wherein the partitioning indicates how many of the beam-level filters to allocate to a first category of beamformed signals and how many of the beam-level filters to allocate to a second category of beamformed signals based on a determination that a number of beamformed signals detected for monitoring exceeds filtering capabilities of the wireless device;

program code for detecting a first set of beamformed signals from one or more cells;

program code for allocating the beam-level filters of the wireless device to a subset of beamformed signals of the first set of beamformed signals based on the partitioning and the detected beamformed signals; and program code for monitoring the subset of the first set of beamformed signals using the allocated beam-level filters.

3. A wireless device, comprising:

one or more interfaces;

memory; and processing circuitry configured to execute instructions stored in the memory, whereby the wireless device is configured to:

determine a partitioning of beam-level filters of the wireless device into partitions, wherein the partitioning indicates how many of the beam-level filters to allocate to a first category of beamformed signals and how many of the beam-level filters to allocate to a second category of beamformed signals based on a determination that a number of beamformed signals detected for monitoring exceeds filtering capabilities of the wireless device;

detect a first set of beamformed signals from one or more cells;

allocate the beam-level filters of the wireless device to a subset of beamformed signals of the first set of beamformed signals based on the partitioning and the detected beamformed signals; and monitor the subset of the first set of beamformed signals using the allocated beam-level filters.

4. The wireless device of claim 3, wherein the wireless device is further configured to allocate the beam-level filters based on rules received from a network to which the wireless device is connected.

5. The wireless device of any claim 3, wherein the wireless device is further configured to allocate the beam-level filters based on one or more rules determined by the wireless device.

6. The wireless device of claim 3, wherein the wireless device is further configured to allocate a respective one of the beam-level filters further based on a characteristic of the respective beam-level filter.

7. The wireless device of claim 3, wherein the wireless device is further configured to associate one of the beam-level filters with one of the beamformed signals in the first set of beamformed signals for a predetermined time period.

8. The wireless device of claim 3, wherein the beam-level filters are L1 filters or L3 filters.

9. The wireless device of claim 3, wherein there is a maximum number (N) of beam-level filters available to be allocated to monitor beamformed signals.

10. The wireless device of claim 3, wherein the wireless device is further configured to:

determine that allocating the beam-level filters based on the partitioning results in not all of the beam-level filters being used and, in response, allocate more beam-level filters than indicated by the partitioning to at least one category of beamformed signals detected in the first set of beamformed signals.

11. The wireless device of claim 3, wherein each of the partitions is associated with a cell, carrier, reference signal, or carrier type.

12. The wireless device of claim 3, wherein the partitions comprise:

a first partition associated with a serving or camping cell of the one or more cells; and a second partition associated with one or more neighbor cells of the one or more cells.

13. The wireless device of claim 3, wherein the partitions comprise:

a first partition associated with a serving or camping cell of the one or more cells; and a plurality of other partitions, each associated with a respective neighbor cell of the one or more cells.

14. The wireless device of claim 3, wherein the partitions are defined per carrier and a number of allocated beam-level filters is zero for a non-serving carrier and non-zero for a serving carrier or carrier component.

15. The wireless device of claim 3, wherein the partitions are determined based on available processing or memory resources in the wireless device.

16. The wireless device of claim 3, wherein:

there is a maximum number (N) of beam-level filters available to be allocated to monitor beamformed signals; and the sum of a number of beam-level filters partitioned into each respective partition equals N.

17. The wireless device of claim 3, wherein the wireless device is further configured to reallocate the beam-level filters.

18. The wireless device of claim 17, wherein:

the wireless device is further configured to detect a second set of beamformed signals, wherein the second set of beamformed signals is not the same as the first set of beamformed signals; and wherein reallocation of the beam-level filters is based on differences between the first set of beamformed signals and the second set of beamformed signals.

19. The wireless device of claim 3, wherein the wireless device is further configured to remove one or more beamformed signals from the subset of beamformed signals to which the beam-level filters have been allocated.

20. The wireless device of claim 3, wherein the wireless device is further configured to determine one or more measurements of the first set of beamformed signals.

21. The wireless device of claim 20, wherein the wireless device is further configured to delay measurement of the first set of beamformed signals if a number of beam-level filters required to monitor the subset of the first set of beamformed signals is greater than a number of beam-level filters allocated to the subset of the first set of beamformed signals.

22. The wireless device of claim 3, wherein the wireless device is further configured to determine a maximum number of beam-level filters to allocate to the subset of beamformed signals of the first set based on a maximum number of beam level filters to be allocated to each of one or more serving or camping cells and a maximum number of beam-level filters to be allocated to each of one or more neighbor cells.

* * * * *